United States Patent
Sakamoto

(10) Patent No.: US 6,364,585 B1
(45) Date of Patent: Apr. 2, 2002

(54) TORQUE-CONTROLLABLE SCREW WITH KNOB

(75) Inventor: Rikio Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/713,257

(22) Filed: Nov. 16, 2000

(30) Foreign Application Priority Data

Nov. 18, 1999 (JP) .......... 11-328768

(51) Int. Cl.⁷ .......... F16B 31/00; F16B 33/04
(52) U.S. Cl. .......... 411/7; 411/408; 411/919
(58) Field of Search .......... 411/6, 7, 402, 411/408, 919

(56) References Cited

U.S. PATENT DOCUMENTS

| | | | | |
|---|---|---|---|---|
| 2,634,650 A | * | 4/1953 | Coop .......... | 411/6 |
| 2,729,134 A | * | 1/1956 | Stanton, Jr. et al. .......... | 411/6 |
| 3,425,314 A | * | 2/1969 | Ohlson .......... | 411/7 |
| 4,176,582 A | * | 12/1979 | Witte .......... | 411/7 |
| 5,154,557 A | * | 10/1992 | Houck .......... | 411/7 |
| 6,082,941 A | * | 7/2000 | Dupont et al. .......... | 411/7 |

FOREIGN PATENT DOCUMENTS

| | | |
|---|---|---|
| JP | 07-240821 | 9/1995 |
| JP | 07-269589 | 10/1995 |
| JP | 08-74879 | 3/1996 |
| JP | 09-56117 | 2/1997 |
| JP | 10-138175 | 5/1998 |

\* cited by examiner

*Primary Examiner*—Neill Wilson
(74) *Attorney, Agent, or Firm*—Sughrue Mion, PLLC

(57) ABSTRACT

In the screw of the present invention, a screw shaft and knob have a torque controller which rotates the screw shaft and the knob together until a rotating torque between the screw shaft and the knob reaches a predetermined level, and slips the knob toward the screw shaft if the rotating torque exceeds the predetermined level, while the knob is rotated along a direction for screwing the screw; and the torque controller also rotates the screw shaft and the knob together even if the rotating torque exceeds the predetermined level, while the knob is rotated along a direction for unscrewing the screw. Therefore, the screw can properly fasten and unfasten with the screw controller.

6 Claims, 1 Drawing Sheet

TORQUE-CONTROLLABLE SCREW WITH KNOB

BACKGROUND OF THE INVENTION

1. Field of the Invention

The present invention relates to a torque-controllable screw with a knob which can control the torque when the screw is screwed and tightened. This application is based on patent application No. Hei 11-328768 filed in Japan, the contents of which are incorporated herein by reference.

2. Description of the Related Art

There exists a screw which has a screw shaft in which a male screw is cut on one end thereof and a knob connected to the other end of thereof. The screw is used for fastening a SCSI type outer terminal connector or a SCSI type cable connector.

With this type of screw, little consideration is placed on the rotation direction, so that, if the screw is mainly designed for unfastening, the screw may slip toward a female screw for engaging the male screw, before the screw is fastened with necessary force. On the other hand, if the screw is mainly designed for fastening, the screw may slip when the screw is unfastened from the female screw. Thus, an object of the present invention is to provide a screw which can satisfactorily both fasten and unfasten.

SUMMARY OF THE INVENTION

A screw of the present invention comprises a screw shaft in which a male screw is cut on one end and a knob which is connected to the other end thereof. Furthermore, the screw shaft and the knob have a torque controller which rotates the screw shaft and the knob together until a rotating torque between the screw shaft and the knob reaches a predetermined level, and slips the knob toward the screw shaft if the rotating torque exceeds the predetermined level, while the knob is rotated along a direction for screwing the screw; and the torque controller also rotates the screw shaft and the knob together even if the rotating torque exceeds the predetermined level, while the knob is rotated along a direction for unscrewing the screw.

With this torque controller, the maximum level of the rotating torque along the direction for unscrewing the screw can be greater than that of the rotating torque along the direction for screwing the screw. Therefore, if the screw is mainly designed for fastening, the screw does not slip when the screw is unfastened. Thus, the screw can properly fasten and unfasten when used with simple structures.

It is preferable that the torque controller has claws on the outer surface of the screw shaft, and that each of the claws has a first inclined surface which contacts the knob at a relatively gentle angle when the knob is rotated along the direction for screwing the screw, and a second inclined surface which contacts the knob at a relatively sharp angle when the knob is rotated along the direction for unscrewing the screw.

With this torque controller, because the first inclined surface contacts the knob at a relatively gentle angle, the torque for getting over the claws is reduced when the knob is rotated along the direction for screwing the screw. Furthermore, because the second inclined surface contacts the knob at a relatively sharp angle, the torque for getting over the claws increases when the knob is rotated along the direction for screwing the screw. Therefore, if the screw is mainly designed for fastening, the screw does not slip when the screw is unfastened.

It is further preferable that the knob has projections on the inner circumferential surface of the knob, and each of the projections contacts the first inclined surface and elastically deform on the first inclined surface when the knob is rotated along the direction for screwing the screw with a rotating torque which exceeds the predetermined level.

DESCRIPTION OF THE PREFERRED EMBODIMENT

The preferred embodiment of the present invention will be described in the following. This embodiment is a torque-controllable screw with a knob for fastening a SCSI type outer terminal connector or a SCSI type cable connector. With this screw, the damage of the screw when the screw is fastened and the slip of the screw when the screw is unfastened are prevented by controlling the torque during the fastening of the screw, by providing a torque controller 14 shown in FIG. 4 on a knob insert portion 12 of a screw shaft 11 and a knob 13 which is connected with the knob insert portion 12 shown in FIG. 1.

Figure 1:
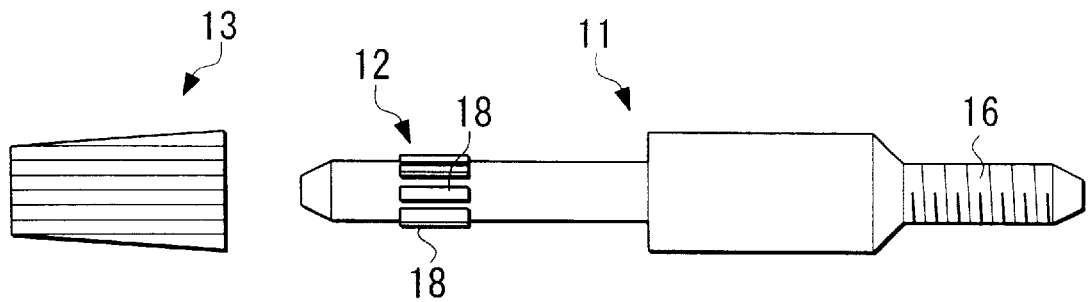
FIG. 1 is an exploded side view of an embodiment of the screw of the present invention.
Figure 2:
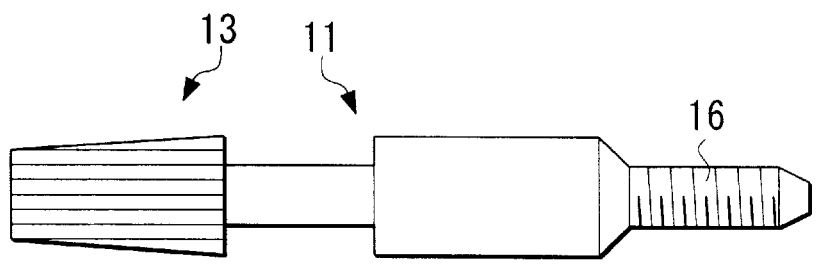
FIG. 2 is a side view of the embodiment of the screw of the present invention.

The screw shaft 11 of the torque-controllable screw with knob is made of a metal, and has a male screw 16 which is cut on one end and the resinous knob 13 which is connected to the knob insert portion 12 on the other end of the screw shaft 11 as shown in FIGS. 1 and 2.

Figure 3:
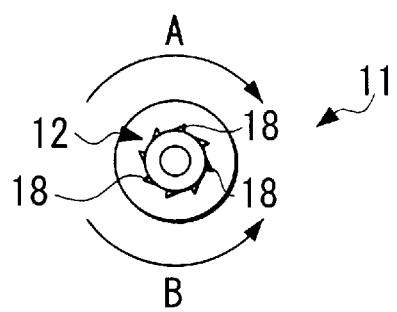
FIG. 3 is a front view of the screw shaft of the embodiment of the screw of the present invention.
Figure 4:
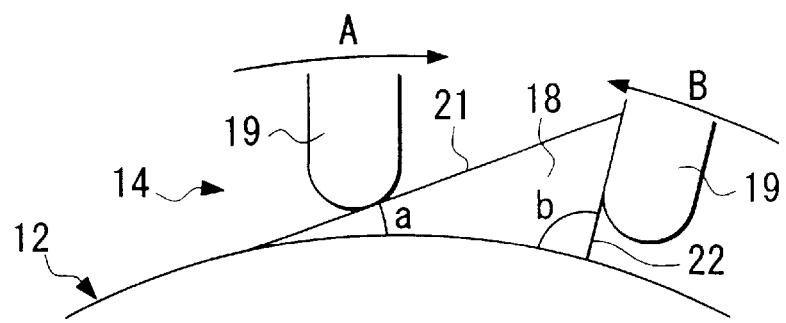
FIG. 4 is a partial enlarged view of the embodiment of the screw of the present invention.

The torque controller 14 is provided on the screw shaft 11 and the knob 13. The torque controller 14 has a plurality of claws 18 on the knob insert portion 12 of the screw shaft 11 as shown in FIGS. 3 and 4. The claws 18 are formed so as to engage projections 19 on the inner circumferential surface of the resinous knob 13 when the knob 13 is rotated along the direction for unscrewing the male screw 16 from a part in which the screw is fastened (unfastening direction "B"). The claws 18 are also formed so as to slip when the knob 13 is rotated along the direction for screwing the male screw 16 into the part (fastening direction "A") with the torque (force) which is greater than a predetermined level.

The claws 18 are of a specific shape and projecting from the outer circumferential surface of the knob insert portion 12 of the screw shaft 11. In every claw 18, an angle "b" at the upper side along the direction B is greater than an angle "a", at the upper side along the direction A. More concretely, every claw 18 of the torque controller 14 has a first inclined surface 21 which contacts each projection 19 of the knob 13 at the relatively gentle angle "a" so as to rotate the screw shaft 11 along the fastening direction A by rotating the knob 13, and a second inclined surface 22 which contacts each projection 19 of the knob 13 at the relatively sharp angle "b" which is nearly a right angle, so as to rotate the screw shaft 11 along the unfastening direction B by rotating the knob 13. These angles "a" and "b" can be determined by the trial rotations of the knob 13.

When the knob 13 is rotated along the fastening direction A, the screw shaft 11 rotate together with the knob 13 by contact between the first inclined surfaces 21 and the projections 19 of the torque controller 14 until the rotating torque between the screw shaft 11 and the knob 13 reaches the predetermined level. However, when the rotating torque between the screw shaft 11 and the knob 13 exceeds the predetermined level, the projections 19 are elastically deformed along the direction B on the first inclined surfaces 21 and the knob 13 slips toward the screw shaft 11. Meanwhile, when the knob 13 is rotated along the fastening direction B, the screw shaft 11 rotates together with the knob 13 by contact between the second inclined surfaces 22 and the projections 19 of the torque controller 14 although the rotating torque between the screw shaft 11 and the knob 13 exceeds the predetermined level.

That is, when the knob 13 is rotated along the direction A for fastening the screw, the knob 13 slips toward the screw shaft 11 when the rotating torque exceeds the predetermined level. As a result, if the screw is fastened with excessive force, the knob 13 slips before the screw is damaged, and therefore, damage of the screw is prevented. Furthermore, when the knob 13 is rotated along the direction B for unfastening the screw, the knob 13 rotates together with the screw shaft 11 without slip by the engagement of the claws 18 and the projections 19. Therefore, the slip of the knob 13 at the unfastening of the screw is prevented though the knob 13 is unfastened with the excessive force.

In addition, the knob 13 dropping out of the screw shaft 11 is prevented although the insert portion 12 of the screw shaft 11 is only inserted into the knob 13, because a recess (not shown in Figures) for engaging the claws 18 is provided on the inner surface of the knob 13.

Furthermore, the embodiment described above can be applied to whole connectors using this type of screw with knob. Moreover, the embodiment can be also applied to whole screws, each having a screw shaft and a resinous knob rotatively installed on the shaft.

What is claimed is:

1. A screw comprising:

a screw shaft having a male screw cut on one end, and a knob connected to a second end;

said screw shaft and said knob forming a torque controller;

wherein said torque controller includes claws on the outer surface of said second end of said screw shaft, each of said claws having a first surface and a second surface, and elastically deformable projections on an inner surface of said knob, said projections contacting said first surface of said claws when said screw is rotated in a direction for screwing and said second surface when screw is rotated in a direction for unscrewing; and said first surface of said claws are inclined at a first angle that cause said projections to elastically deform to slide over said first surface when said rotating torque between said screw shaft and said knob reaches a first predetermined level; whereby said torque controller rotates said screw shaft and said knob together until a rotating torque between said screw shaft and said knob reaches said first predetermined level, and slips said knob on said screw shaft in the direction of rotation if said rotating torque exceeds said predetermined level, while said knob is rotated along a direction for screwing said screw.

2. A screw as claimed in claim 1, wherein said second surface of said claws is inclined at a second angle greater than said first angle; whereby said torque controller rotates said screw shaft and said knob together even if said rotating torque exceeds said first predetermined level while said knob is rotated along a direction for unscrewing said screw.

3. A screw as claimed in claim 1, wherein said second surface of said claws is inclined at a second angle equal to or less than said first angle; whereby said second angle causes said projections to elastically deform to slide over said second surface when said rotating torque between said screw shaft and said knob reaches a second predetermined level;

said torque controller rotates said screw shaft and said knob together until said rotating torque exceeds said second predetermined level while said knob is rotated along a direction for unscrewing said screw.

4. A screw as claimed in claim 1, where said knob is generally cylindrically shaped, with a closed end and an open end.

5. A screw as claimed in claim 1, where said knob is comprised of a resin.

6. A screw as claimed in claim 1, where said screw is of the type used on a SCSI controller.

* * * * *